United States Patent [19]

Maida

[11] 3,753,387

[45] Aug. 21, 1973

[54] BRIDGE TYPE EXPOSURE METER

[75] Inventor: Osamu Maida, Toshima-ku, Tokyo, Japan

[73] Assignee: Nippon Kogaku K.K., Tokyo, Japan

[22] Filed: Aug. 22, 1972

[21] Appl. No.: 282,712

[30] Foreign Application Priority Data
Sept. 2, 1971  Japan................................ 46/67691

[52] U.S. Cl.......... 95/10 CE, 95/10 CT, 95/10 CD, 95/64 D
[51] Int. Cl. ............................................. G03b 7/08
[58] Field of Search ...................... 95/10 CE, 10 CT, 95/10 CD, 64 D; 318/640

[56] References Cited
UNITED STATES PATENTS

| | | | |
|---|---|---|---|
| 3,450,969 | 6/1969 | Sato et al............................. | 318/640 |
| 3,587,420 | 6/1971 | Llop................................. | 95/10 CD |
| 3,455,227 | 7/1969 | Sato et al............................. | 95/64 D |
| 3,580,157 | 5/1971 | Casebeer............................ | 95/64 D |

*Primary Examiner*—Samuel S. Matthews
*Assistant Examiner*—Russell E. Adams, Jr.
*Attorney*—Joseph M. Fitzpatrick et al.

[57] ABSTRACT

An exposure determining device comprises a bridge circuit which includes a photoelectric element for receiving light from an object, and first, second and third resistors. The first resistor is variable for controlling the balance of the bridge circuit and for introducing an exposure factor. One end of the first resistor is connected to one end of the photoelectric element, and one end of the second resistor is connected to the other end of the photoelectric element. One end of the third resistor is connected to the other end of the first resistor. Means for detecting the balance of the bridge circuit is provided and includes *npn* and *pnp* transistors. The *npn* transistor has its base connected to the junction between the photoelectric element and the first resistor and has its emitter connected to the other end of the third resistor. The *pnp* transistor has its base connected to that junction and has its emitter connected to the other end of the second resistor. The detecting means may produce a first and a second signal representing the balance and unbalance of the bridge circuit. A voltage divider is connected between the other ends of the second and third resistors. A third transistor is provided and has its base connected to the voltage divider. Control circuit means is connected to the collectors of the *npn* and *pnp* transistors to receive the first and second signals from the detecting means for determining a proper exposure.

8 Claims, 3 Drawing Figures

3,753,387

BRIDGE TYPE EXPOSURE METER

BACKGROUND OF THE INVENTION

1. Field of the Invention

This invention relates to bridge-type exposure meters having a complementary symmetrical bridge balance detecting means, and more particularly to improvements in such exposure meters.

2. Description of the Prior Art

In an exposure meter of the class described, the tolerance for the indication of a proper exposure is determined by the width of the insensitive zone provided in the balance detecting circuit thereof, as will later be described. The smallest possible tolerance for the indication of a proper exposure is desirable for actual photography with a proper exposure, whereas it has been virtually impossible because of various factors set forth hereunder to reduce the width of the insensitive zone, which is essential to determine a proper exposure, below a certain level.

SUMMARY OF THE INVENTION

I have conceived an exposure meter of the class described which provides high accuracy, thus to reduce the width of the aforesaid insensitive zone as desired, and accordingly can reduce the tolerance for the indication of a proper exposure to a substantially greater degree than any conventional exposure meter known to me.

According to an embodiment of the present invention, the exposure determining device comprises a bridge circuit including a photoelectric element adapted to receive light from an object to be photographed, a first resistance element having one end connected to one end of the photoelectric element, the first resistance element being variable for controlling the balance of the bridge circuit and for introducing an exposure factor, a second resistance element having one end connected to the other end of the photoelectric element, and a third resistance element having one end connected to the other end of the first resistance element. Means for detecting the balance of the bridge circuit are provided which include an npn transistor whose base terminal is connected to the junction between the photoelectric element and the first resistance element and whose emitter terminal is connected to the other end of the third resistance element, and a pnp transistor whose base terminal is connected to the junction between the photoelectric element and the first resistance element and whose emitter terminal is connected to the other end of the second resistance element. The detecting means produces a first signal upon balancing of said bridge circuit and a second signal upon unbalancing of said bridge circuit. A voltage divider is connected between the other ends of the second and third resistance elements. A third transistor is provided whose base terminal is connected to the voltage divider so that the voltage divided by said voltage divider is applied to the base terminal of the third transistor and whose emitter and collector terminals are connected between the other ends of the second and third resistance elements. Control circuit means are connected to the collector terminals of the npn and pnp transistors to receive the first and second signals from the detecting means for determining a proper exposure.

According to a feature of the present invention, the control circuit means include first and second indicating means actuated in response to the first and second signals. The first indicating means is actuated to indicate a proper exposure when the control circuit means receive the first signal. The second indicating means is actuated to indicate an improper exposure when the control circuit means receive the second signal.

The control circuit means may include means for controlling a diaphragm aperture opening in response to the first and second signals.

A source of potential is connected between the junction between the photoelectric element and the second resistance element and the junction between the first and third resistance elements; the voltage divider may include two resistors connected in series with each other; and the base terminal of the third transistor is connected to the junction between these two resistors.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENTS

In order better to understand the present invention, the balance detecting circuit of the bridge-type exposure meter according to the prior art will first be explained.

Figure 1:
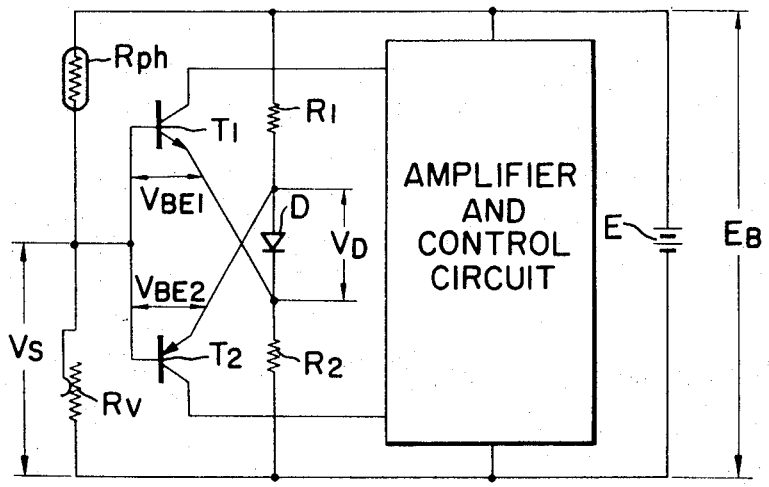
FIG. 1 is a circuit diagram illustrating a balance detecting circuit of the bridge-type exposure meter according to the prior art.

Referring to FIG. 1, an npn transistor T1 and a pnp transistor T2 serve as the balance detecting transistors of a bridge circuit constituted by a photoelectric element Rph, a balancing variable resistor Rv actuated in response to exposure factors such as diaphragm aperture opening and shutter time, and resistors R1 and R2. The collectors of the transistors T1 and T2 are connected to the base of a transistor (not shown) in an amplifier and control circuit to amplify signals from the bridge circuit. The outputs of the detecting transistors T1 and T2 may control a meter, a motor, a lamp or like means so as to indicate whether the exposure is proper or not.

A bias diode D is connected between the resistors R1 and R2 to apply a bias between the emitters of the detecting transistors T1 and T2, thereby to reduce the width of an insensitive zone which will be described. The resistors R1 and R2 have an equal resistance value which is of a sufficient magnitude to pass an amount of current which permits the diode to reach a saturation voltage to compensate for voltage reduction. A signal voltage Vs may be produced at the point of connection between the photoelectric element Rph and the variable resistor Rv. $V_{BE1}$ and $V_{BE2}$ are threshold voltages or base-emitter voltages provided just before a base current flows to the transistors T1 and T2 to render these transistors conductive. These voltages are normally in the range of 0.4 to 0.45 volt when T1 and T2 are silicon transistors. $E_B$ designates the voltage of an electric power source E, and $V_D$ a bias voltage produced by the bias diode D. The bias voltage is normally in the range of 0.6 to 0.7 volt when D is a silicon diode.

If the signal voltage Vs, just before the transistor T1 is conductive, is represented by $Vs_1$ and the signal voltage Vs, just before the transistor T2 is conductive, is represented by $Vs_2$, then $$Vs_1 = (E_B - V_D)/(R1 + R2) \cdot R2 + V_{BE1} \quad (1)$$

$$Vs_2 = (E_B - V_D)/(R1 + R2) \cdot R2 + V_D - V_{BE2} \quad (2)$$

If $V_{BE1} = V_{BE2} = V_{BE}$, for simplification, and since $R1 = R2$, $$Vs_1 = (E_B - V_D)/2 + V_{BE}' \quad (3)$$

$$Vs_2 = (E_B - V_D)/2 + V_D - V_{BE}' \quad (4)$$

Let $Rph_1$ and $Rph_2$ be the values of $Rph$ assumed for $Vs_1$ and $Vs_2$, respectively, then, $$Vs_1 = E_B \cdot Rv/(Rph_1 + Rv) \quad (5)$$

$$Vs_2 = E_B \cdot Rv/(Rph_2 + Rv) \quad (6)$$

Equation (3) equals equation (5) and equation (4) equals equation (6), hence, $$Rph_1 = (E_B + V_D - 2V_{BE}')/(E_B - V_D + 2V_{BE}') \cdot Rv \quad (7)$$

$$Rph_2 = (E_B - V_D + 2V_{BE}')/(E_B + V_D - 2V_{BE}') \cdot Rv \quad (8)$$

Since $V_D = 0.6 - 0.7V$ and $V_{BE}' = 0.4 - 0.45V$, $V_D < 2V_{BE}'$. Accordingly, $Rph_1 < Rph_2$.

This means that both transistors T1 and T2 are non-conductive when Rph is such that $Rph_1 < Rph < Rph_2$. The transistors T1 and T2 remain non-conductive irrespective of any change of Rph within the foregoing range. The area which is determined by $Rph_1$ and $Rph_2$ and within which both transistors T1 and T2 remain non-conductive is referred to as the "insensitive zone". EV1 designates light value equivalent to the resistance value $Rph_1$ of the photoelectric element $Rph$, and EV2 designates light value equivalent to the resistance value Rph.

The relation between light value EV and brightness of the object to be photographed is given by:

$$2^{EV1} = K \cdot B_1, \quad 2^{EV2} = K \cdot B_2 \quad (9)$$

where
$B_1$ = brightness of the object when Rph = $Rph_1$,
$B_2$ = brightness of the object when Rph = $Rph_2$, and
$K$ = constant,
brightness of the object and the resistance value of the photoelectric element have the following relation:

$$Rph_1 = a \cdot B_1^{-\gamma}, \quad Rph_2 = a \cdot B_2^{-\gamma} \quad (10)$$

where $\gamma$ = constant inherent to the photoelectric element, and $a$ = constant From Eqs. (9) and (10), the insensitive zone width, which is represented by $Rph_1$ Rph $Rph_2$, can be noted by a light value as follows:

$$EV1 - EV2 = 1/\gamma \log 2 \cdot \log Rph_2/Rph_1 \quad (11)$$

When $\Delta EV = EV1 - EV2$, from Eq. (11) the insensitive zone width is given by:

$$\Delta EV = 1/\log 2 \log Rph_2/Rph_1 \quad (12)$$

By applying equations (7) and (8) to equation (12), there is obtained:

$$\Delta EV = 2/\gamma \log 2 \log (E_B - V_D + 2V_{BE}')/(E_B + V_D - 2V_{BE}') \quad (13)$$

Thus, during the photometry, even if the balance of the bridge is destroyed due to the relation between the resistance values of the elements Rph and Rv, a state similar to the balanced state of the bridge will be indicated as long as such destruction is within the range of $\Delta Ev$ about the balance point. Since the bridge circuit is balanced at the proper exposure, $\Delta Ev$ is determined by various factors $\gamma$, $E_B$, $V_D$ and $V_{BE}$, as seen in equation (13). Therefore, reducing $\Delta Ev$, i.e., the tolerance of proper exposure, may theoretically be achieved as by using a great value of $\gamma$ for Rph, or by increasing $E_B$, or by approximating $V_D$ to $2V_{BE}'$ or approximating $2V_{BE}'$ to $V_D$. A photoelectric element having a great value of $\gamma$ is difficult to obtain because of limited manufacturing capabilities. An increased $E_B$ will unavoidably and undesirably lead to an increase in the volume and weight of the electric power source used. The last method, i.e., the approximation of $V_D$ to $2V_{BE}'$ or vice versa, cannot be freely used in view of the physical properties of the transistor.

Since bias voltage $V_D$ must also be stable for any variation in the source voltage, it is undesirable to insert resistors connected in series with the diode D between the emitters of the transistors $T_1$ and $T_2$ to approximate $V_D$ to $2V_{BE}'$. Also, the use of a plurality of similar diodes as the diode D will result in $V_D = 0.yN - 0.7N(N = 1, 2$ and so on), so that when $N > 1$, the condition $V_D < 2V_{BE}'$ will be deviated from. The use of germanium diodes instead of silicon diodes will satisfy the said condition, but this is undesirable because the irregularity of $2V_{BE}'$ and $V_D$ is not taken into account as an actual problem and will seriously adversely affect $\Delta EV$.

Thus, with the bridge-type exposure meter of the prior art, it is practically impossible, ude to the abovedescribed various factors, to reduce the tolerance of a proper exposure. The present invention eliminates all the described disadvantages of the prior art by replacing the diode with transistors for the purpose of biasing and reduced-voltage compensation so as to permit a free choice of the value of $V_D$ and to reduce $\Delta EV$, and also to absorb the irregularity of $2V_{BE}'$ to provide a constant value of $\Delta EV$ at all times while maintaining a reduced-voltage compensating characteristic equivalent to that of the diode.

The present invention will now be described with respect to an embodiment thereof.

Figure 2:
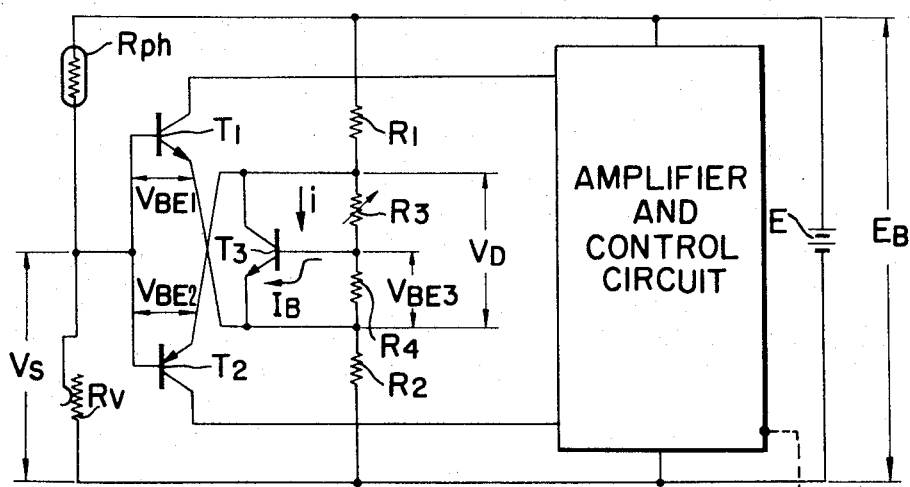
FIG. 2 is a circuit diagram illustrating the balance detecting circuit of the bridge-type exposure meter according to an embodiment of the present invention.
Figure 2:
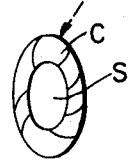

Referring to FIG. 2, a photoelectric element $Rph$ and a balancing variable resistor $Rv$ are connected in series with each other. One end of the photoelectric element $Rph$ is connected to the positive terminal of an electric power source E. One end of the variable resistor $Rv$ is connected to the negative terminal of the source E. The point of connection between $Rph$ and $Rv$ is connected to the bases of npn transistor T1 and pnp transistor T2, which serve to detect the balance of the bridge. Between resistors R1 and R2, which cooperate with the elements $Rph$ and $Rv$ to constitute the bridge circuit, a semi-fixed resistor R3 and a resistor R4 are serially connected. A bias npn transistor T3 has its base connected to the mid-point between the two resistors R3 and R4. The collector and emitter of the transistor T3 is connected to the mid-point between the resistor R1 and the semi-fixed resistor R3 and to the mid-point between the resistor R2 and the resistor R4, respectively. One end of the resistor R1 is connected to the positive terminal of the electric power source E and one end of the resistor R2 is connected to the negative terminal of the source E. The resistors R1 and R2 are equal in resistance value.

The emitters of the transistors T1 and T2 are connected to the emitter and collector of the transistor T3, respectively. The collectors of the transistors T1 and T2 are connected to the base of a transistor (not shown) in an amplifier and control circuit to amplify output signals from said collectors. The output signals of the transistors T1 and T2 control a meter, a motor, a lamp or like means in the amplifier and control circuit to determine the proper exposure. That is to say, the meter and the lamp indicate the proper exposure by deflection of the pointer of the meter and by turn-on of the lamp, respectively, and the motor is interconnected to a diaphragm adjusting means C to control the diaphragm aperture opening S in response to the output signals of the transistors T1 and T2, thereby automatically provide the proper exposure. $V_D$ designates the collector-emitter voltage of the transistor T3, i.e., the bias voltage for the transistors T1 and T2 detecting the balance of the bridge. Current amplification factor $h_{FE}$ of transistor T3 is sufficiently great, and the semi-fixed resistor R3 is selected to satisfy the following relationship:

$$h_{FE} \cdot R1 >> R3$$

Let $i$ be the current flowing through the semi-fixed resistor R3, $I_B$ the base-current flowing to the transistor T3, and $V_{BE3}$ the base-emitter voltage of the transistor T3. Then, $$I_B = i - B_{BE3}/R_4 \quad (14)$$

$$i = (E_B - V_D)/2R1 - h_{FE}I_B \quad (15)$$

$$V_D = iR3 + V_{BE3} \quad (16)$$

Equations (14) and (15) give:

$$i = 1/(h_{FE} + 1) \left[ ((E_B - V_D)/2_{R1} + h_{FE}V_{BE3}/R_4) \right] \quad (17)$$

Equations (16) and (17) give:

$$V_D = R_3 E_B / 2(h_{FE} + 1)R_1 + R3 + 2(h_{FE} + 1)R1/[2(h_{FE} + 1)R1 + R3]$$

$$[(R_3 h_{FE}/R_4 (h_{FE} + 1) + 1)]V_{BE3} \quad (18)$$

Since $h_{FE} >> 1$ and $2h_{FE}R1 >> R3$, $$V_D = (R3/R4 + 1)V_{BE3} \quad (19)$$

By preselecting the resistors R1, R2, R3 and R4 so that the base-emitter voltage may operate in a saturation range, $V_{BE3}$ may be maintained substantially constant, i.e., in the range of 0.6 to 0.7V for silicon transistors, irrespective of any variation in the source voltage. Equation (19) means that the value of $V_D$ can be freely obtained stably without being affected by any source voltage variation, and by varying the ratio of resistance value of the resistor R3 to the resistor R4. Thus, $V_D$ can be freely approximated to $2V_{BE}'$ within the range of $V_D < 2V_{BE}'$ so as to provide an optimum insensitive zone, i.e., a tolerance of proper exposure.

Figure 3:
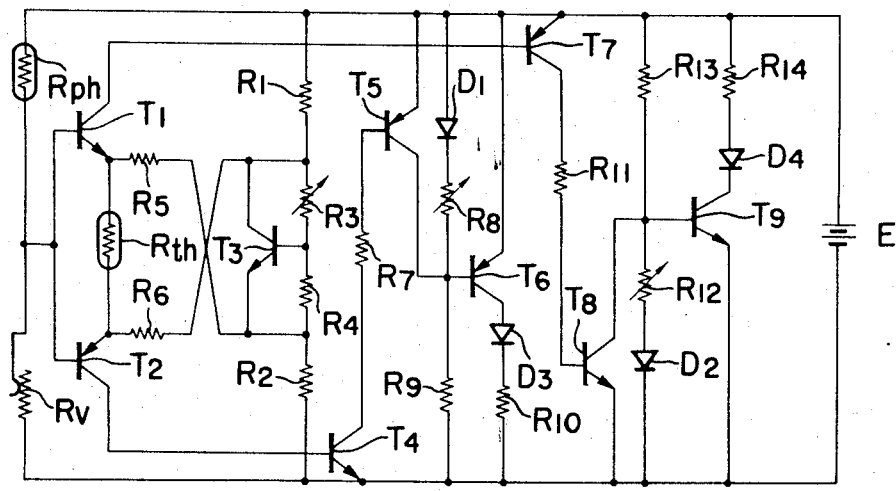
FIG. 3 is a circuit diagram of a lamp-lit exposure meter to which the present invention has been applied.

FIG. 3 shows an application of the present invention to a lamp-lit exposure meter.

$Rph$ is a photoelectric element such as CdS. $Rv$ is a function resistor whose characteristic is determined by the illumination vs. resistance value characteristic $\gamma$ of the element $R_{ph}$ and by a mechanical interlocking system with adjustment means for F-value, film sensitivity or shutter time, and exposure adjusting factors such as film sensitivity, shutter time and F-value are to be introduced into the function resistor $Rv$.

Resistors R1 and R2 cooperate with the photoelectric element Rph and function resistor $Rv$ to constitute a bridge circuit. The photoelectric elements $Rph$ and the function resistor $Rv$ are connected in series with each other. One end of the element $Rph$ is connected to the positive terminal of the electric power source E and one end of the function resistor $Rv$ is connected to the negative terminal of the power source E. The midpoint between the element $Rph$ and the resistor $Rv$ is connected to the bases of npn transistor T1 and pnp transistor T2 which serve to detect the balance of the bridge.

Resistor R1, semi-fixed resistor R3, resistor R4 and resistor R2 are serially connected together. One end of the resistor R1 is connected to the positive terminal of the electric power source E and one end of the resistor R2 is connected to the negative terminal of the power source E. The collector of bias npn transistor T3 is connected to the point of connection between the resistor R1 and the semi-fixed resistor R3, the base of the transistor T3 is connected to the point of connection between the resistor R3 and the resistor R4, and the emitter of the transistor T3 is connected to the point of connection between the resistor R4 and the resistor R2. The emitter of the transistor T1 is connected through resistor R5 to the point of connection between the resistors R4 and R2. The emitter of the transistor T2 is connected through a resistor R6 to the point of connection between the resistor R1 and the semi-fixed resistor R3. The resistors R5 and R6 are equal in resistance value. A thermistor Rth is connected between the emitter of the transistor T1 and the emitter of the transistor T2 to cooperate with the resistors R5 and R6 to compensate for variations in the insensitive zone width due to temperature variations.

The semi-fixed resistor R3 is preadjusted so that the bias voltage between the emitters of the transistors T1 and T2 is the voltage across the optimum insensitive zone width.

The collector of the transistor T2 is connected to the base of the npn transistor T4. The emitter of transistor T4 is connected to the negative terminal of the electric power source E and the collector of this transistor is connected through resistor R7 to the base of pnp transistor T5. The emitter of the transistor T5 is connected to the positive terminal of the power source E and the collector of the same transistor is connected to the base of pnp transistor T6. The emitter of the transistor T6 is connected to the positive terminal of the electric power source E and the collector of this transistor is connected to the anode of luminous diode D3, whose cathode is connected through resistor R10 to the negative terminal of the electric power source E. The anode of temperature compensating diode D1 is connected to the positive terminal of the electric power source E and the cathode of the diode D1 is connected to semi-fixed resistor R8, one end of which is connected to resistor R9, one end of which is, in turn, connected to the negative terminal of the power source E. The point of connection between the resistor R9 and the semi-fixed resistor R8 is connected to the base of transistor T6 to apply a bias current to this transistor. The semi-fixed resistor R8 is preadjusted so that the transistor T6 is conductive when the transistor T5 is non-conductive for the normal source voltage and that the transistor T6 is non-conductive irrespective of the state of transistor T5 when the source voltage drop below a minimum usable level. Similarly, the collector of the transistor T1 is connected to the base of *pnp* transistor T7. The emitter of the transistor T7 is connected to the positive terminal of the electric power source E and the collector of the same transistor is connected through resistor R11 to the base of npn transistor T8. The emitter of the transistor T8 is connected to the negative terminal of the power source E and the collector of this transistor is connected to the base of npn transistor T9. The emitter of the transistor T9 is connected to the negative terminal of the electric power source E and the collector of this transistor is connected with the cathode of luminous diode D4, whose anode is connected through resistor R14 to the positive terminal of the electric power source E.

The cathode of the temperature compensating diode D2 is connected to the negative terminal of the electric power source E and the anode of this diode is connected to semi-fixed resistor R12 having one end connected to resistor R13 which, in turn, has one end connected to the positive terminal of the power source E. The point of connection between the resistor R13 and the semi-fixed resistor R12 is connected to the base of transistor T9 to apply a bias current to this transistor. The semi-fixed resistor R12 is preadjusted so that the transistor T9 is conductive when the transistor T8 is non-conductive for the normal source voltage and that the transistor T9 is non-conductive irrespective of the state of the transistor T8 when the source voltage drops below the minimum usable level.

The operation of the device, according to the present invention, will now be described with respect to underexposure, over-exposure and tolerance of proper exposure.

In the case of under-exposure, the resistance value of the element Rph is higher than the level for the balanced state of the bridge, i.e., the level for proper exposure, so that the base voltages of the transistors T2 and T1 drop down. When these base voltages become lower by a predetermined value than the reference voltage determined by the bias voltage applied to the emitter of the transistor T2, i.e., lower than the base-emitter voltage necessary for the transistor T2 to conduct, the transistor T2 becomes conductive. The collector current of the transistor T2 is amplified by the transistor T4 and transmitted to the transistor T5, which is thereby rendered conductive. When the transistor T5 conducts, the base voltage of the transistor T6 is made equal to the emitter voltage thereof, thus rendering the transistor T6 non-conductive. On the other hand, the transistor T1 is oppositely biased and hence non-conductive, so that the transistors T7 and T8 become non-conductive while the transistor T9 is rendered conductive because it is so biased by resistor R13. Thus, no current flows to turn on the diode D3, but a current does flow to turn on the diode D4. The turn-on of the diode D4 alone indicates that a combination of exposure adjusting factors such as diaphragm aperture diameter, shutter time, etc., is in a condition for under-exposure. Such condition may be adjusted into proper exposure by moving the combination of the exposure adjusting factors in the direction for over-exposure, more specifically, in the direction for increasing the value of Rv.

In the case of over-exposure, the resistance value of the photoelectric element *Rph* is lower than the level for the balanced state of the bridge, i.e., lower than the resistance value for proper exposure, so that the base voltages of the transistors T2 and T1 rise. When these base voltages become higher, by a predetermined value, than the reference voltage determined by the bias voltage applied to the emitter of the transistor T1, i.e., higher than the base-emitter voltage necessary for the transistor T1 to conduct, the transistor T1 becomes conductive. The collector current of the transistor T1 is amplified by the transistor T7 and transmitted to the transistor T8, which is thereby rendered conductive. When the transistor T8 becomes conductive, the base voltage of the transistor T9 is made equal to the emitter voltage thereof, thus rendering the transistor T9 non-conductive. On the other hand, the transistor T2 is oppositely biased and hence the transistors T2, T4 and T5 become non-conductive while the transistor T6 is conductive because it is so biased by the resistor R9. Thus, no current flows to turn on the diode D4, but a current flows to turn on the diode D3 indicating that a combination of exposure adjusting factors such as aperture diameter, shutter time, etc., is in a condition for over-exposure. Such condition may be adjusted into proper exposure by moving the combination of the exposure adjusting factors into the direction for under-exposure, more specifically, in the direction for decreasing the value of Rv.

When the foregoing combination is within the tolerance of proper exposure (that is, when the resistance value of $Rph$ is within the proper insensitive zone width $\Delta\ EV$ determined by the bias voltage supplied from T3), both transistors T1 and T2 are non-conductive with no base current flowing thereto and, therefore, the transistors T4, T5, T7 and T8 also become non-conductive. As a result, the transistors T6 and T9 become conductive to turn on both diodes D3 and D4, which thus indicate that the combination of the exposure adjusting factors is in the condition for proper exposure.

While the present invention has been described above with respect to its application to a lamp-lit exposure meter, it will be apparent to those skilled in the art that the invention is not limited thereto, but is effectively applicable to other types of exposure meters or automatic exposure meters adapted automatically to control the bridge balance (generally known as servo EE). The invention has also been disclosed with respect to the balancing circuit of an exposure meter in particular, but it should be understood that the invention may similarly work as a balance detecting circuit which employs ordinary transistors to detect the balance of the bridge.

Further, the transistor T3 used in the two embodiments is an *npn* transistor but, of course, a pnp transistor may be used as the transistor T3.

It will thus be appreciated that the present invention enables the value of $F_D$ freely to approximate to $2V_{BE}$ by varying the relation of the resistance value of the resistor R3 to the resistor R4, and accordingly enables the width of the insensitive zone to be reduced as much as desired. In other words, the tolerance for the indication of proper exposure can be made very much smaller by the present invention than by any known conventional device of similar type, and accordingly proper exposure with a greater accuracy can be achieved by the present invention.

I believe that the construction and operation of my novel bridge-type exposure meter will now be understood, and that its advantages will be fully appreciated by those persons skilled in the art.

I claim:

1. An exposure determining device comprising:
    a bridge circuit including a photoelectric element adapted to receive light from an object to be photographed, a first resistance element having one end connected to one end of said photoelectric element, said first resistance element being variable for controlling the balance of said bridge circuit and for introducing an exposure factor, a second resistance element having one end connected to the other end of said photoelectric element, and a third resistance element having one end connected to the other end of said first resistance element;
    means for detecting the balance of the bridge circuit, said detecting means including an *npn* transistor whose base terminal is connected to the junction between said photoelectric element and said first resistance element and whose emitter terminal is connected to the other end of said third resistance element, and a *pnp* transistor whose base terminal is connected to said junction and whose emitter terminal is connected to the other end of said second resistance element, said detecting means producing a first signal upon balancing of said bridge circuit and a second signal upon unbalancing of said bridge circuit;
    a voltage divider connected between the other ends of said second and third resistance elements;
    a third transistor whose base terminal is connected to said voltage divider so that the voltage divided by said voltage divider is applied to said base terminal of said third transistor and whose emitter and collector terminals are connected between the other ends of said second and third resistance elements; and
    control circuit means connected to said collector terminals of said *npn* and *pnp* transistors to receive said first and second signals from said detecting means for determining a proper exposure.

2. An exposure determining device according to claim 1, wherein said control circuit means includes first and second indicating means actuated in response to the first and second signals, said first indicating means being actuated to indicate a proper exposure when said control circuit means receives said frist signal, said second indicating means being actuated to indicate an improper exposure when said control circuit means receives said second signal.

3. An exposure determining device according to claim 1, wherein said control circuit means include means for controlling a diaphragm aperture opening in response to said first and second signals.

4. An exposure determining device according to claim 1, further comprising a source of potential connected between the junction between said photoelectric element and said second resistance element and the junction between said first and third resistance elements.

5. An exposure determining device according to claim 1, wherein said voltage divider includes two resistors connected in series with each other, said base terminal of said third transistor being connected to the junction between said two resistors.

6. An exposure determining device according to claim 1, wherein said bridge circuit is in balance when the proper exposure is obtained.

7. An exposure determining device according to claim 6, wherein both of said *npn* and *pnp* transistors become non-conductive upon balancing of said bridge circuit and one of said *npn* and *pnp* transistors becomes conductive upon unbalancing of said bridge circuit, said non-conductivity of both said *npn* and *pnp* transistors serving as said first signal, said conductivity of one of said *npn* and *pnp* transistors serving as said second signal.

8. An exposure determining device according to claim 7, wherein said control circuit means include first and second indicating means actuated in response to said first and second signals, said first indicating means being actuated to indicate an under-exposure when one of said *pnp* and *npn* transistors is non-conductive, said second indicating means being actuated to indicate an over-exposure when the other of said *pnp* and *npn* transistors is non-conductive, said first and second indicating means being actuated to indicate a proper exposure when both said *pnp* and *npn* transistors are non-conductive.

* * * * *